(12) United States Patent
Nakayama et al.

(10) Patent No.: US 8,908,242 B2
(45) Date of Patent: Dec. 9, 2014

(54) IMAGE READING APPARATUS AND MEDIUM CONVEYING DEVICE

(71) Applicants: Daisuke Nakayama, Nagoya (JP); Hirofumi Suzuki, Kiyosu (JP)

(72) Inventors: Daisuke Nakayama, Nagoya (JP); Hirofumi Suzuki, Kiyosu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 13/851,648

(22) Filed: Mar. 27, 2013

(65) Prior Publication Data

US 2014/0092454 A1    Apr. 3, 2014

(30) Foreign Application Priority Data

Sep. 28, 2012 (JP) ................ 2012-216557

(51) Int. Cl.
   H04N 1/04 (2006.01)
   G03G 15/00 (2006.01)
   H04N 1/00 (2006.01)

(52) U.S. Cl.
   CPC ............... H04N 1/00602 (2013.01)
   USPC ........................ 358/498; 399/110

(58) Field of Classification Search
   USPC .......................................... 358/498
   See application file for complete search history.

(56) References Cited

U.S. PATENT DOCUMENTS

| | | | | |
|---|---|---|---|---|
| 8,508,819 B2 * | 8/2013 | Asada et al. | ................ | 358/498 |
| 2005/0057785 A1 | 3/2005 | Endo | | |
| 2007/0292159 A1 * | 12/2007 | Iijima | ........................ | 399/110 |
| 2008/0259414 A1 | 10/2008 | Kitagawa et al. | | |
| 2008/0285097 A1 | 11/2008 | Kitagawa et al. | | |
| 2011/0188097 A1 * | 8/2011 | Asada et al. | ................ | 358/498 |
| 2012/0105925 A1 * | 5/2012 | Shirai et al. | ................ | 358/498 |

FOREIGN PATENT DOCUMENTS

| | | | |
|---|---|---|---|
| JP | H09-284478 A | 10/1997 | |
| JP | 2005-051313 A | 2/2005 | |
| JP | 2008-270954 A | 11/2008 | |
| JP | 2008-285259 A | 11/2008 | |
| JP | 2011-066676 A | 3/2011 | |
| JP | 2012-015677 A | 1/2012 | |
| JP | 2012-034186 A | 2/2012 | |
| JP | 2012-065064 A | 3/2012 | |
| JP | 2012-100115 A | 5/2012 | |
| JP | 2012-171788 A | 9/2012 | |
| JP | 2012-171789 A | 9/2012 | |
| JP | 2012-184057 A | 9/2012 | |
| JP | 2012-216930 A | 11/2012 | |
| JP | 2012-216931 A | 11/2012 | |

* cited by examiner

*Primary Examiner* — Charlotte M Baker
*Assistant Examiner* — Rury Grisham
(74) *Attorney, Agent, or Firm* — Baker Botts L.L.P.

(57) ABSTRACT

An image reading apparatus includes a roller that rotates about a rotating axis and conveys a particular medium in a conveying direction, a reader that reads the particular medium, and a body. The body includes a first port formed in the body, and a lid pivotably attached to the body and pivots about a pivoting axis, which is perpendicular to the conveying direction and the rotating axis. The lid pivots between a first position, in which the lid covers at least a portion of the first port, and a second position, in which the lid is separated from the first port.

15 Claims, 14 Drawing Sheets

IMAGE READING APPARATUS AND MEDIUM CONVEYING DEVICE

CROSS-REFERENCE TO RELATED APPLICATION

This application claims priority from Japanese Patent Application No. 2012-216557 filed on Sep. 28, 2012, which is incorporated herein by reference.

BACKGROUND OF THE INVENTION

1. Field of the Invention

The invention relates generally to an image reading apparatus and a medium conveying device.

2. Description of Related Art

A known image reading apparatus may have a body including a first inlet port, a first ejection port, a second inlet port, and a second ejection port. A conveyance path may be formed in the body.

A first medium may be introduced into the first inlet port. The first medium may be ejected from the first ejection port. A second medium having smaller width than that of the first medium may be introduced into the second inlet port. The second medium may be ejected from the second ejection port. The second ejection port may remain open. The conveyance path may guide the first medium from the first inlet port to the first ejection port and guide the second medium from the second inlet port to the second ejection port.

In the known image reading apparatus, the first medium and the second medium which are different in width may be conveyed with the first inlet port, the first ejection port, the second inlet port, the second ejection port and the conveyance path.

In the known image reading apparatus, because the second ejection port remains open, the user may inadvertently insert the second medium, which should have been inserted in the second inlet port, in the second ejection port ("a reverse insertion"). If the user performs the reverse insertion of the second medium in the second ejection port, the reverse insertion may overload various components provided in the conveyance path and a malfunction occur.

SUMMARY OF THE INVENTION

According to an embodiment of the invention, an image reading apparatus comprising: a roller configured to rotate about a rotating axis and configured to convey a particular medium in a conveying direction, a reader configured to read the particular medium; and a body. The body comprises a first port formed in the body; and a lid pivotably attached to the body and configured to pivot about a pivoting axis, which is perpendicular to the conveying direction and the rotating axis. The lid is configured to pivot between a first position, in which the lid covers at least a portion of the first port, and a second position, in which the lid is separated from the first port.

Other objects, features, and advantages will be apparent to persons of ordinary skill in the art from the following detailed description of the invention and the accompanying drawings.

BRIEF DESCRIPTION OF THE DRAWINGS

For a more complete understanding of the present invention, needs satisfied thereby, and the objects, features, and advantages thereof, reference now is made to the following description taken in connection with the accompanying drawings.

DETAILED DESCRIPTION OF EMBODIMENTS OF THE INVENTION

Figure 1:
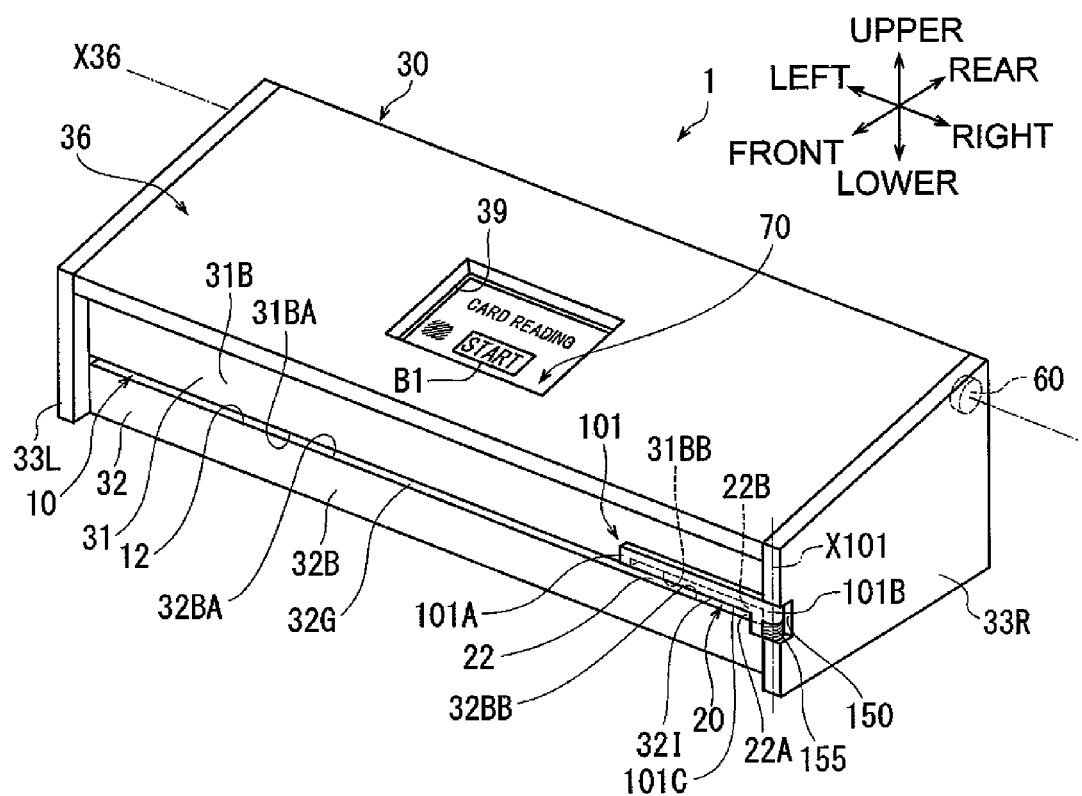
FIG. 1 is a perspective view illustrating a front side of an image reading apparatus according to an embodiment of the invention.

Example embodiments are described in detail herein with reference to the accompanying drawings, like reference numerals being used for like corresponding parts in the various drawings.

Referring to FIG. 1, an image reading apparatus 1 may include a housing 30, a feed tray 36, a control substrate 54, a conveyance unit 40, a reading unit 55, e.g., a reader, a lid 101, opening and closing mechanisms 150 and 155, a touch panel 70, and an open/close position sensor 60.

Figure 3:
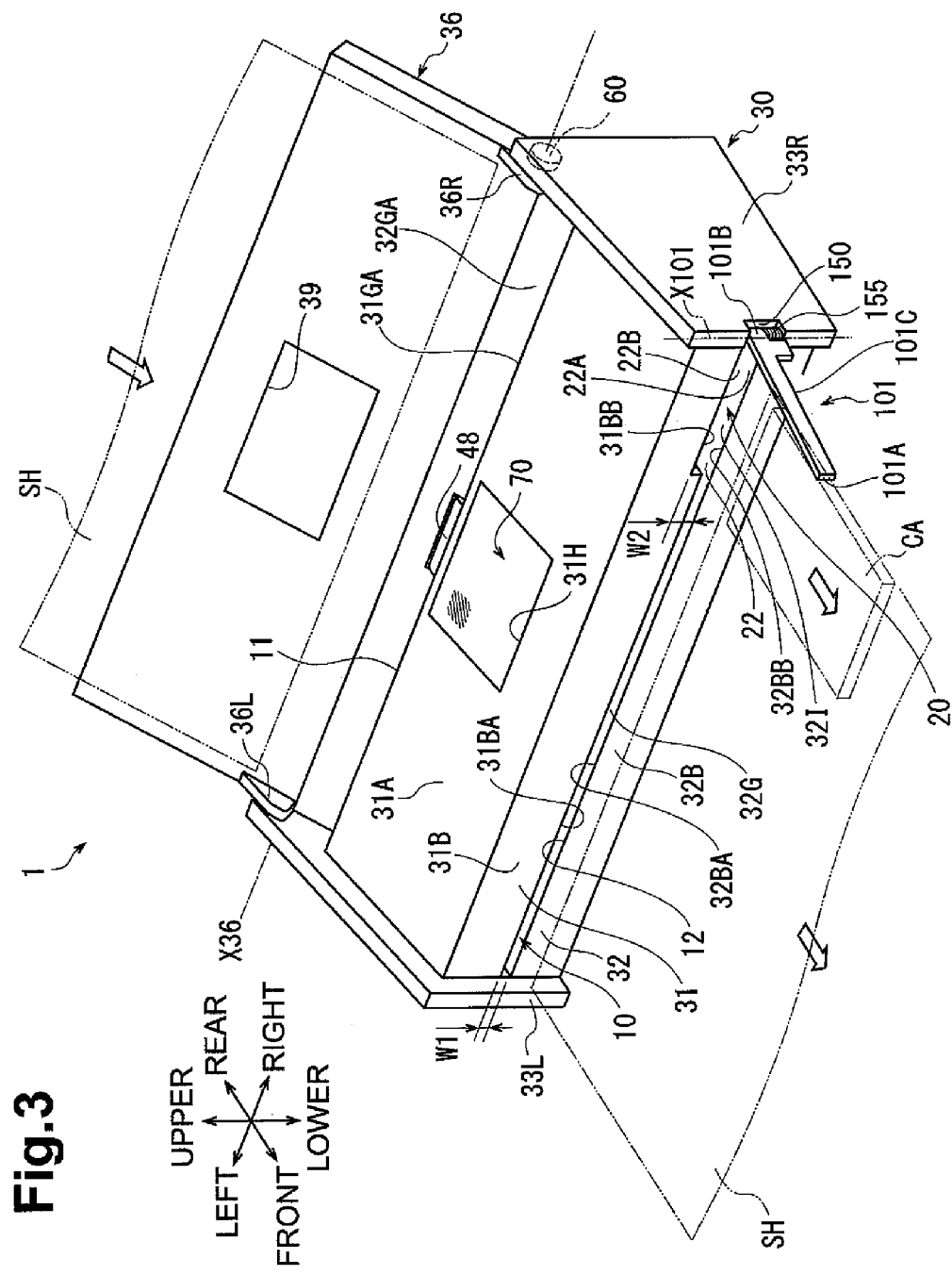
FIG. 3 is a perspective view illustrating a front side of an image reading apparatus including a feed tray according to an embodiment of the invention.
Figure 6:
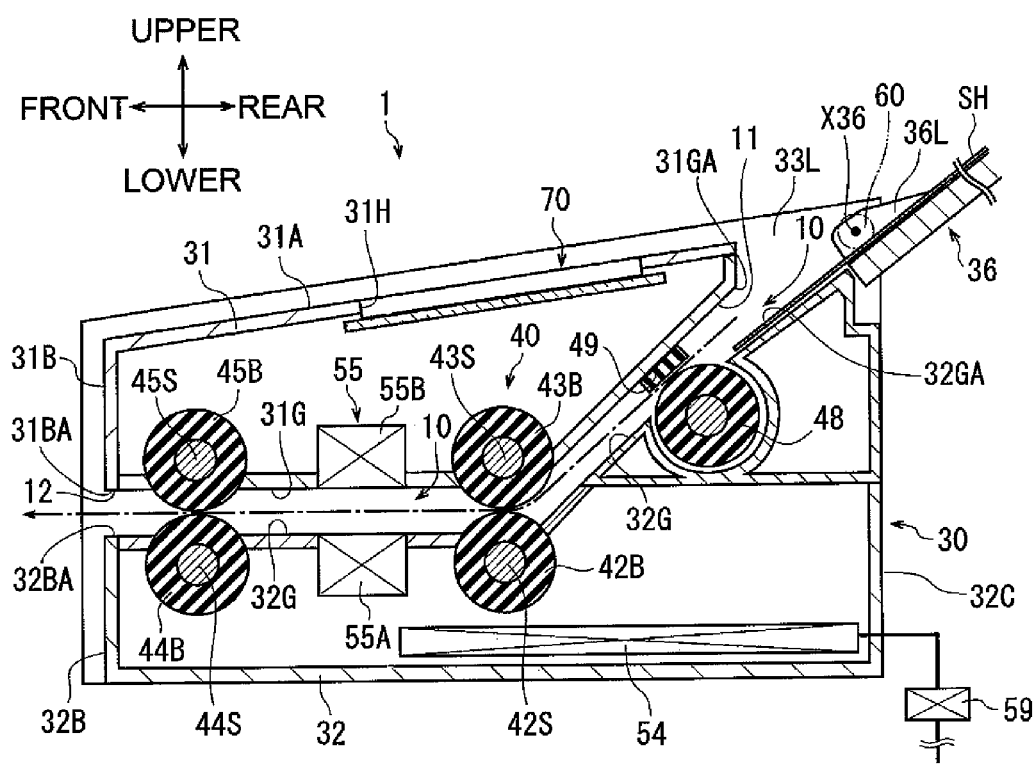
FIG. 6 is a cross-sectional view along line A-A of FIG. 5 according to an embodiment of the invention.
Figure 7:
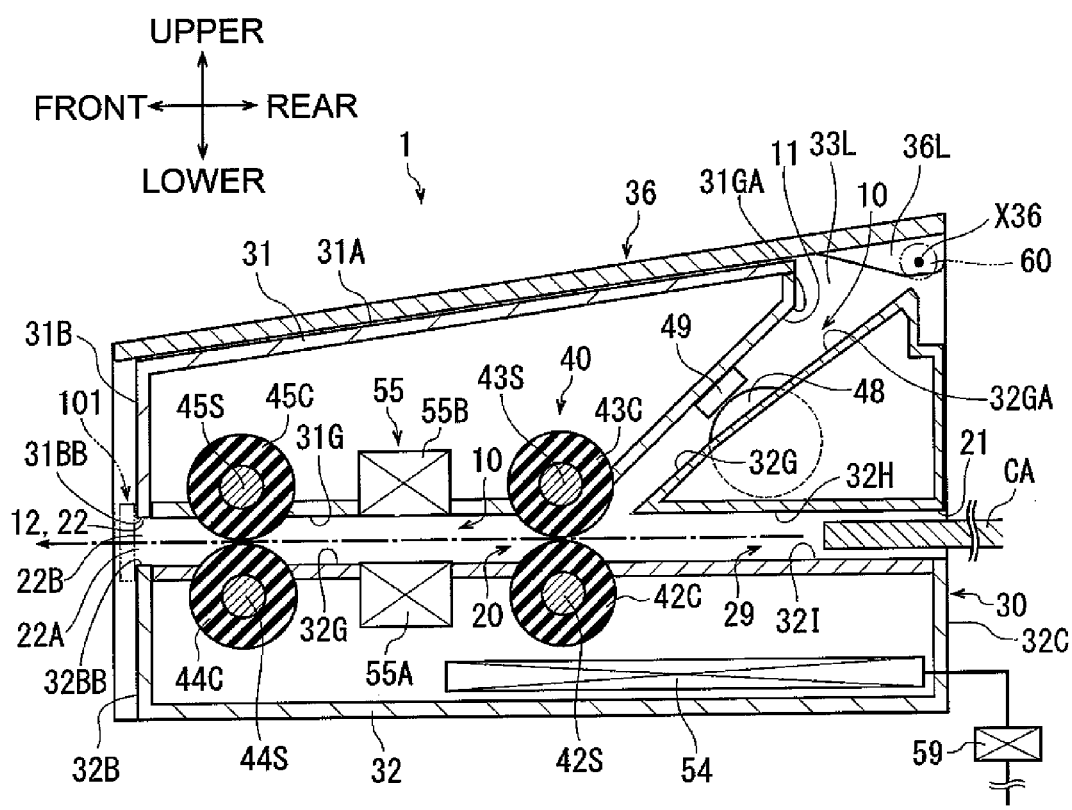
FIG. 7 is a cross-sectional view along line B-B of FIG. 5 according to an embodiment of the invention.

Referring to FIGS. 3, 6, and 7, the housing 30, e.g., body, may include a first housing 31, a second housing 32, and a pair of side frames 33L and 33R.

The first housing 31 may be positioned at an upper side and the second housing 32 may be positioned at a lower side. The first and second housings 31 and 32 may face each other in the vertical direction with a space formed therebetween. The left side frame 33L and the right side frame 33R may be disposed on the outer left and right sides of the first housing 31 and the second housing 32.

The first housing 31 may include an upper surface 31A, a front surface 31B and an upper guide surface 31G. The upper surface 31A may be a flat surface which faces upward. The upper surface 31A may slope upward toward a rear direction. The touch panel 70 may be provided at the center of the upper surface 31A. The front surface 31B may be a flat surface which faces to the front. The front surface 31B may continue from a front end edge of the upper surface 31A and extend vertically downward. The upper guide surface 31G may be a flat surface which is bent and facing downward. The upper guide surface 31G may continue from a lower end edge 31BA of the front surface 31B and extend substantially horizontally in the rear direction. The upper guide surface 31G may be bent at substantially the center of the first housing 31 in the front-rear direction and slope upward toward the rear direction.

The second housing 32 may include a front surface 32B, a lower guide surface 32G, and a rear surface 32C. The front surface 32B may be a flat surface which faces to the front. The upper end edge 32BA of the front surface 32B may be separated from the lower end edge 31BA of the front surface 31B with a space therebetween. The front surface 32B may extend vertically downward. The lower guide surface 32G may be a flat surface which is bent and facing upward. The lower guide surface 32G may continue from the upper end edge 32BA of the front surface 32B and extend horizontally in the rear direction. The lower guide surface 32G may be bent at the center of the second housing 32 in the front-rear direction and may be sloped upward toward the rear direction. The rear surface 32C may be a flat surface which faces to the rear. The rear surface 32C may extend vertically downward.

Figure 5:
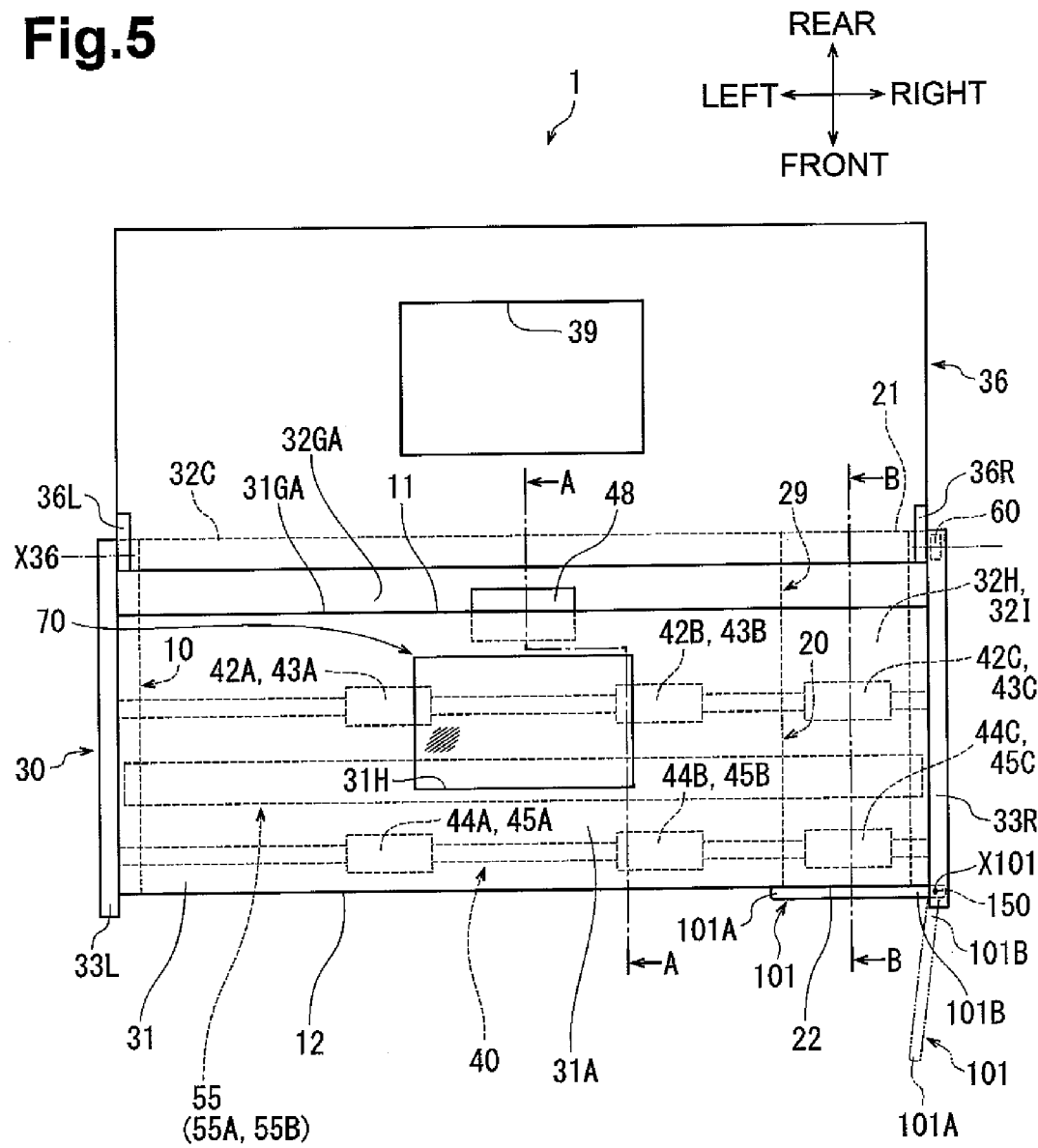
FIG. 5 is a top view of an image reading apparatus in which a feed tray is in an operating position according to an embodiment of the invention.

Referring to FIGS. 5 and 7, the second housing 32 may include a lower card guide surface 32I and an upper card guide surface 32H. The lower card guide surface 32I may continue from a right end portion of a horizontal section of the lower guide surface 32G and extend horizontally in the rear direction to reach the rear surface 32C. The upper card guide surface 32H may be separated from and disposed upward from the lower card guide surface 32I. The upper card guide surface 32H may extend in parallel with the lower card guide surface 32I and horizontally in the rear direction to reach the rear surface 32C. Referring to FIG. 7, the height of the upper card guide surface 32H in the vertical direction may be substantially the same as that of the horizontal section of the upper guide surface 31G in the vertical direction.

The side of the rear surface 32C may be an example of a first side of a reading unit in the conveying direction of the first medium. The front surface 31B and the front surface 32B may be examples of a second side of the reading unit in the conveying direction of the first medium.

Referring to FIGS. 1-3 and 5-7, a first inlet port 11, the first ejection port 12 and a conveyance path 10 may be formed in the housing 30. Referring to FIGS. 3, 6, and 7, a sheet SH may be introduced into the first inlet port 11. The sheet SH may be a paper sheet and an OHP sheet. The sheet SH may be an example of the first medium. The first inlet port 11 may be formed between the first housing 31 and the second housing 32. In particular, the first inlet port 11 may be formed by a gap between a rear end edge 31GA of the upper guide surface 31G and a rear end edge 32GA of the lower guide surface 32G. The first inlet port 11 may extend from a position near the left side frame 33L to a position near the right side frame 33R in the left-right direction. The length of the first inlet port 11 in the left-right direction may be greater than the width of the sheet SH in the left-right direction.

The sheet SH may be ejected from the first ejection port 12. The first ejection port 12 may be formed between the first housing 31 and the second housing 32. In particular, the first ejection port 12 may be formed by a gap between the lower end edge 31BA of the front surface 31B and the upper end edge 32BA of the front surface 32B. The first ejection port 12 may extend from a position near the left side frame 33L to a position near the right side frame 33R in the left-right direction. The length of the first ejection port 12 in the left-right direction may be set to be greater than the width of the sheet SH in the left-right direction.

The width direction of the first ejection port 12 may correspond to the left-right direction. The side of one end of the width direction of the first ejection port 12 may correspond to the side of the right side frame 33R.

Referring to FIGS. 6 and 7, the conveyance path 10 may guide the sheet SH from the first inlet port 11 to the first ejection port 12. The conveyance path 10 may be formed between the first housing 31 and the second housing 32. In particular, the conveyance path 10 may be formed by the upper guide surface 31G and the lower guide surface 32G which are disposed on the upper and lower sides of the conveyance path 10. The conveyance path 10 may slope downward in the front direction from the first inlet port 11. The conveyance path 10 may be bent in the front direction at the center of the housing 30 in the front-rear direction and may extend horizontally to reach the first ejection port 12.

Referring to FIGS. 5 and 7, a card conveying area 20 may be positioned on the side of a right end of the conveyance path 10. Referring to FIGS. 1-3, 5, and 7, a second inlet port 21, e.g., a first port, a second ejection port 22, and a card path 29 may be formed in the housing 30.

Figure 2:
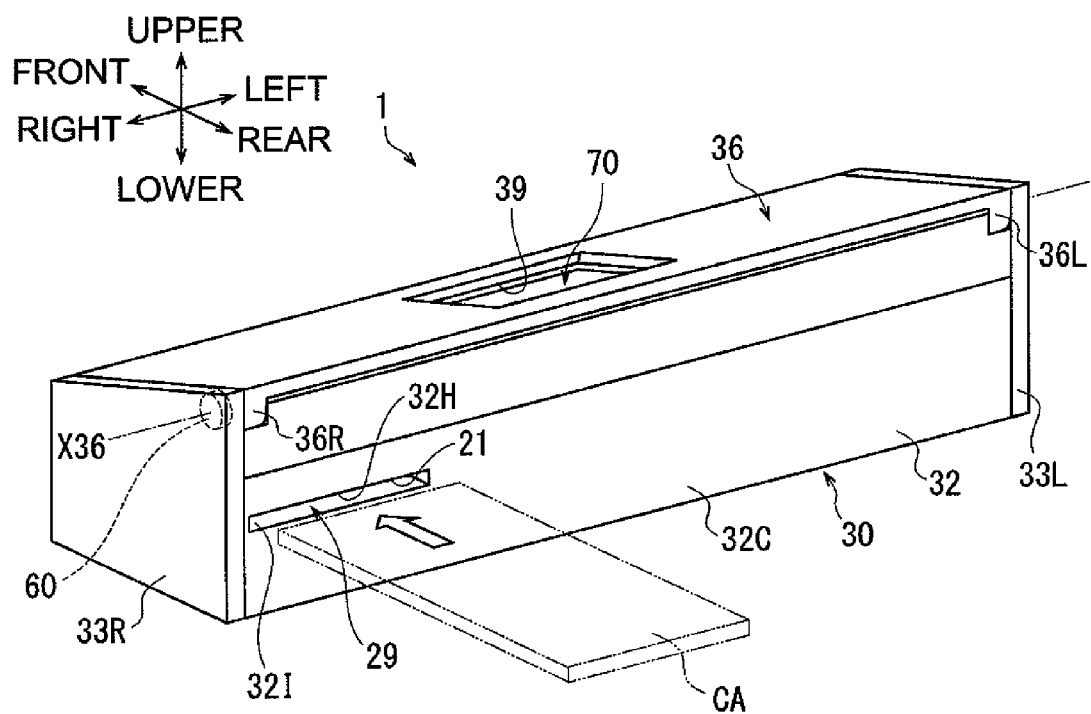
FIG. 2 is a perspective view illustrating a rear side of an image reading apparatus according to an embodiment of the invention.

Referring to FIGS. 2, 5 and 7, a card CA, of which width is smaller than that of the sheet SH, may be introduced into the second inlet port 21. The card CA may be a sheet of which area is smaller than that of the sheet SH. The card CA may be a business card, an ATM card, a membership card, a license card, or the like. The length of the shorter side of the card CA may be, for example, 53.98 mm by the International Standard ID-1 of the International Organization for Standardization (ISO)/Electrotechnical International Commission (IEC). The length of the longer side of the card CA may be, for example, 85.60 mm by the International Standard ID-1 of the International Organization for Standardization (ISO)/Electrotechnical International Commission (IEC). If the card CA is a resin-made license card, the card CA may be thicker than the sheet SH and rigidity thereof may be higher than that of the sheet SH. The card CA may be an example of the second medium of the present disclosure. The second inlet port 21 may be formed in the second housing 32. In particular, the second inlet port 21 may open in the front-rear direction at an intermediate portion in the vertical direction and on the side of the right side frame 33R on the rear surface 32C. The second inlet port 21 may extend in the left-right direction. The length of the second inlet port 21 in the left-right direction may be greater than the width of the card CA. The height of the second inlet port 21 in the vertical direction may be substantially the same as that of the horizontal section of the conveyance path 10 and that of the first ejection port 12 in the vertical direction.

Referring to FIGS. 1, 3, 5, and 7, the card CA may be ejected from the second ejection port 22. The second ejection port 22 may be formed between the first housing 31 and the second housing 32. In particular, the second ejection port 22 may be formed by a gap between a right end portion 31BB in the lower end edge 31BA of the front surface 31B and a right end portion 32BB in the upper end edge 32BA of the front surface 32B. The second ejection port 22 may extend in an elongated manner to the left from a position near the right side frame 33R. The length of the second ejection port 22 in the left-right direction may be greater than that of the width of the card CA.

The second ejection port 22 may be shared by a part of the first ejection port 12 on the side of the right end thereof. Referring to FIG. 1, the first ejection port 12 may include a lower area 22A of the second ejection port 22. Therefore, the sheet SH may pass through the lower area 22A of the second ejection port 22 and may be ejected from the lower area 22A of the second ejection port 22. The card CA may be ejected from the lower area 22A of the second ejection port 22 or may be ejected from the lower area 22A of the second ejection port 22 and an upper area 22B of the second ejection port 22. Thus, the first ejection port may include the second ejection port and the first inlet port may include the second inlet port.

The width direction of the second ejection port 22 may correspond to the left-right direction. The side of one end of the width direction of the second ejection port 22 may correspond to the side of the right side frame 33R. The side of the other end of the width direction of the second ejection port 22 may correspond to the left side frame 33L.

Referring to FIG. 3, the opening width W2 of the second ejection port 22 in the vertical direction may be greater than the opening width W1 of the first ejection port 12 in the vertical direction in accordance with the range of the thickness of the card CA.

Referring to FIGS. 5 and 7, the card path 29 may be formed by the upper card guide surface 32H and the lower card guide surface 32I, which may be disposed on the upper and lower sides of the card path 29. The card path 29 and the card conveying area 20 disposed on the side of the right end of the conveyance path 10 may extend horizontally from the second inlet port 21 at the rear to the second ejection port 22 at the front. The card path 29 and the card conveying area 20 may guide the card CA from the second inlet port 21 to the second ejection port 22.

Referring to FIGS. 3 and 5, a pair of hinge portions 36L and 36R may be formed integrally at left and right corners of the feed tray 36. An operation opening 39 may open upward and may be formed at the center of the feed tray 36. The feed tray 36 may be pivotally supported about an opening and closing axis X36 by the side frames 33L and 33R via the hinge portions 36L and 36R. The opening and closing axis X36 may be disposed at rear and upper end portions of the side frames 33L and 33R and extend in the left-right direction.

Referring to FIGS. 1, 2, and 7, the feed tray 36 may cover the upper surface 31A of the first housing 31 from the upper direction when the feed tray 36 is closed. The position of the feed tray 36, as illustrated in FIGS. 1, 2, and 7 may be defined as a "stored position." At its stored position, the feed tray 36 may slope downward in the front direction from the opening and closing axial center X36. Referring to FIG. 1, the operation opening 39 may expose the touch panel 70 to the exterior when the feed tray 36 is in the stored position.

Referring to FIGS. 3, 5, and 6, the feed tray 36 may be configured to pivot in the rear direction about the opening and closing axis X36 from the state, as illustrated in FIG. 1, and the position of the feed tray 36 may be changed to a position at which the feed tray 36 may slope upward in the rear direction on the rear side of the housing 30. The position of the feed tray 36 illustrated in FIGS. 3, 5, and 6 may be defined as an "operating position."

Referring to FIGS. 3 and 6, the feed tray 36 may extend from a sloped portion of the lower guide surface 32G at the operating position and expose the first inlet port 11. One or a plurality of sheets SH may be placed on the feed tray 36. The feed tray 36 may include a pair of left and right guide units.

The guide units may align, in the left-right direction, the sheet SH placed on the feed tray 36. The sheet SH placed on the feed tray 36 may be introduced into the first inlet port 11 and guided to the first ejection port 12 in the conveyance path 10.

Figure 4:
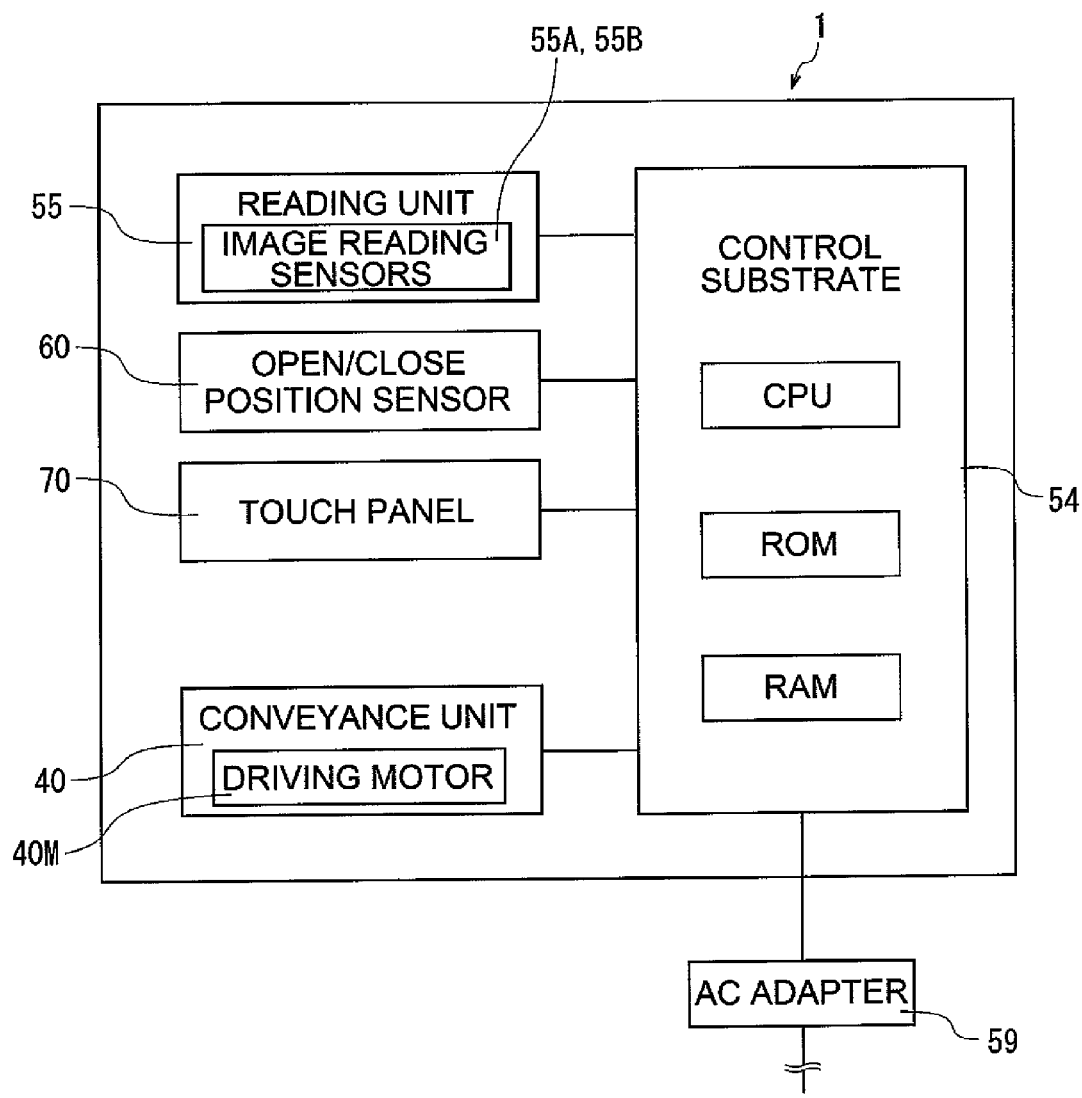
FIG. 4 is a schematic diagram illustrating various portions of an image reading apparatus according to an embodiment of the invention.

Referring to FIGS. 4, 6, and 7, the conveyance unit 40, the reading unit 55, the touch panel 70, the open/close position sensor 60 and other components may be supplied with electric power via an AC adapter 59 and a control substrate 54 from a home electric outlet.

Referring to FIG. 4, the control substrate 54 may include a CPU, ROM and RAM. The control substrate 54 may be electrically connected to and may control the conveyance unit 40, the reading unit 55, the touch panel 70, the open/close position sensor 60 and other components.

Referring to FIGS. 5-7, the conveyance unit 40 may include a separation roller 48, a separating pad 49, conveyance rollers 42A, 42B, and 42C, driven rollers 43A, 43B, and 43C, ejection rollers 44A, 44B, and 44C and driven rollers 45A, 45B, and 45C. The reading unit 55 may include image reading sensors 55A and 55B. These components may be arranged in the conveyance path 10 in the order of the separation roller 48 and the separating pad 49, the conveyance rollers 42A, 42B, and 42C and the driven rollers 43A, 43B, and 43C, the image reading sensors 55A and 55B, the ejection rollers 44A, 44B, and 44C and the driven rollers 45A, 45B, and 45C from the first inlet port 11 to the first ejection port 12.

Referring to FIG. 6, the separation roller 48 may be rotatably supported in the second housing 32. An upper portion of the separation roller 48 may be exposed to the conveyance path 10 from the sloped portion of the lower guide surface 32G. Referring to FIG. 5, the separation roller 48 may be situated at an intermediate position of the conveyance path 10 in the left-right direction. The separation roller 48 may be driven by a driving motor 40M, as illustrated in FIG. 4, when the control substrate 54 controls the driving motor 40M. The separation roller 48 may feed the sheet SH to the conveyance path 10 by contacting the sheet SH which is placed on the feed tray 36.

The separating pad 49 may be attached to the first housing 31. The separating pad 49 may be exposed to the conveyance path 10 on the upper guide surface 31G. The separating pad 49 may be a plate-shaped member including a friction member, such as rubber or elastomer. The separating pad 49 may be urged by an urging member and may press against the separation roller 48. Thus, the separation roller 48 and the separating pad 49 may nip the sheet SH which is being conveyed in the conveyance path 10 to separate each sheet from a plurality of sheets.

Referring to FIGS. 5-7, the conveyance rollers 42A, 42B, and 42C may be rotatably supported in the second housing 32 by a single axis of rotation 42S. Upper portions of the conveyance rollers 42A, 42B, and 42C may be exposed to the conveyance path 10 from a connecting portion between the sloped portion and the horizontal section of the lower guide surface 32G. When the control substrate 54 controls the driving motor 40M, the conveyance rollers 42A, 42B, and 42C may be driven by the driving motor 40M to rotate synchronously with the separation roller 48. The driven rollers 43A, 43B, and 43C may be rotatably supported in the first housing 31 by a single axis of rotation 43S. Lower portions of the driven rollers 43A, 43B, and 43C may be exposed to the conveyance path 10 from a connecting portion of the sloped portion and the horizontal section of the upper guide surface 31G. The driven rollers 43A, 43B and 43C may be urged by an urging member which is not illustrated and may be pressed against the conveyance rollers 42A, 42B, and 42C. Thus, when the sheet SH is conveyed, the conveyance rollers 42A, 42B, and 42C may nip, in cooperation with the driven rollers 43A, 43B, and 43C, the sheet SH which is conveyed in the conveyance path 10, and rotate to convey the sheet SH toward the first ejection port 12.

Since the side of the right end of the conveyance path 10 may be formed as the card conveying area 20, as illustrated in FIGS. 5 and 7, the right conveyance roller 42C and the right driven roller 43C may be exposed to the card conveying area 20. Thus, when the card CA is conveyed, the conveyance roller 42C may nip, in cooperation with the driven roller 43C, the card CA which has been introduced from the second inlet port 21 and passed through the card path 29 in the card conveying area 20, and rotate to convey the card CA to the second ejection port 22.

Referring to FIGS. 5-7, an image reading sensor 55A may be attached to the second housing 32. In particular, the image reading sensor 55A may include a Contact Image Sensor (CIS), a CIS holder and a contact glass. An upper surface of the image reading sensor 55A may be exposed to the conveyance path 10 in the horizontal section of the lower guide surface 32G. An image reading sensor 55B may be attached to the first housing 31. In particular, the image reading sensor 55B may include the CIS, the CIS holder and the contact glass. A lower surface of the image reading sensor 55B may be exposed to the conveyance path 10 in the horizontal section of the upper guide surface 31G. That is, the image reading sensors 55A and 55B may face each other so as to be disposed on the upper and lower sides of the entire conveyance path 10 including the card conveying area 20. The image reading sensors 55A and 55B may read images of both sides of the sheet SH which is conveyed in the conveyance path 10 and read images of both sides of the card CA which is conveyed in the card conveying area 20. That is, the image reading sensors 55A and 55B may read images of both sides of the sheet SH when the sheet SH is conveyed and read images of both sides of the card CA when the card CA is conveyed. The term "face" does not necessarily mean direct face: for example, a part of the image reading sensor 55A may be displaced in position from the image reading sensor 55B in the conveying direction of the sheet SH.

The ejection rollers 44A, 44B, and 44C may be rotatably supported in the second housing 32 by a single axis of rotation 44S. Upper portions of the ejection rollers 44A, 44B, and 44C may be exposed to the conveyance path 10 from the horizontal section of the lower guide surface 32G. When the control substrate 54 controls the driving motor 40M, the ejection rollers 44A, 44B, and 44C may be driven by the driving motor 40M to rotate synchronously with the separation roller 48 and the conveyance rollers 42A, 42B, and 42C. The driven rollers 45A, 45B, and 45C may be rotatably supported in the first housing 31 by a single axis of rotation 45S. Lower portions of the driven rollers 45A, 45B, and 45C may be exposed to the conveyance path 10 from the horizontal section of the upper guide surface 31G. The driven rollers 45A, 45B, and 45C may be urged by an urging member and may press against the ejection rollers 44A, 44B, and 44C. Thus, when the sheet SH is conveyed, the ejection rollers 44A, 44B, and 44C may nip, in cooperation with the driven rollers 45A, 45B, and 45C, the sheet SH which is conveyed in the conveyance path 10, and rotate to eject the sheet SH from the first ejection port 12 to the outside of the housing 30.

Since the side of the right end of the conveyance path 10 may be formed as the card conveying area 20, as illustrated in FIGS. 5 and 7, the right ejection roller 44C and the right driven roller 45C may be exposed also to the card conveying area 20. Thus, when the card CA is conveyed, the ejection roller 44C may nip, in cooperation with the driven roller 45C, the card CA which is conveyed to the conveyance roller 42C and to the driven roller 43C in the card conveying area 20, and rotate to eject the card CA from the second ejection port 22 to the exterior of the housing 30.

Figure 8:
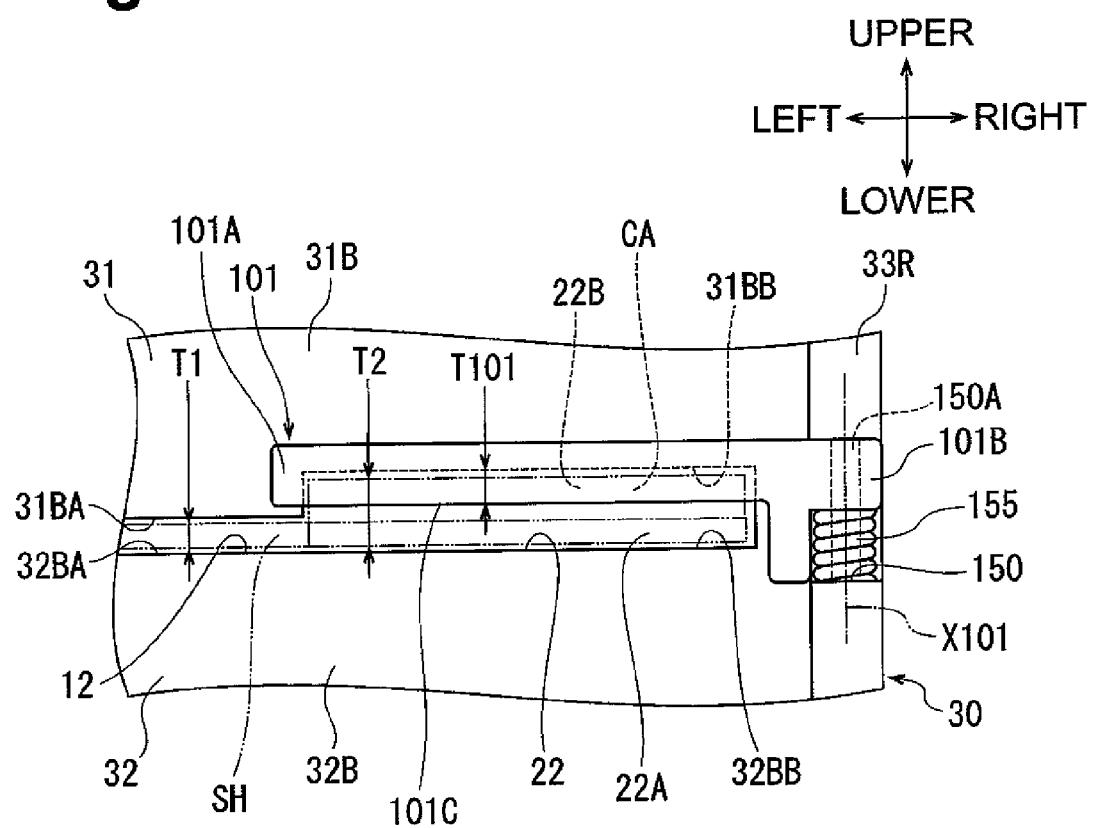
FIG. 8 is an enlarged front view illustrating a second ejection port of an image reading apparatus according to an embodiment of the invention.

Referring to FIGS. 1 and 8, the lid 101 may be a plate-shaped member extending in the left-right direction. An end portion 101A on the left end side of the lid 101 may be disposed on the left side of the second ejection port 22 and the upper side of the first ejection port 12. A base portion 101B on the right end side of the lid 101 may be disposed on a front end edge of the right side frame 33R. A lower end edge 101C of the lid 101 may continue from a lower end of the end portion 101A and extend horizontally to the right direction beyond the second ejection port 22. The lower end edge 101C may be disposed on an upper side of the lower area 22A of the second ejection port 22.

A lid support portion 150 may be formed to be recessed in the rear direction at the front end edge of the right side frame 33R. The lid support portion 150 may be situated on the right side of the second ejection port 22 which is shared by a right end portion of the first ejection port 12. Referring to FIG. 8, the base portion 101B of the lid 101 may be connected to a support shaft 150A included in the lid support portion 150. Thereby, the lid 101 may be pivotably supported by the housing 30 about a pivot axis X101, e.g., pivoting axis, which extends in the vertical direction. The vertical direction in which the pivot axis X101 extends may be an example of the "thickness direction of the card ejected from the second ejection port."

Referring to FIGS. 1 and 8, the lid 101 may be in a closed position. The position of the lid 101 illustrated in a solid line in FIG. 5 may be referred to as the "closed position." In the closed position thereof, the lid 101 may cover an upper area 22B of the second ejection port 22 from the front. In the closed position thereof, the lid 101 may not cover the lower area 22A of the second ejection port 22. The lower area 22A may be an example of the "first area" and the upper area 2213 may be an example of the "second area."

Referring to FIG. 8, the length T101 at which the lid 101 covers the second ejection port 22 in the vertical direction, e.g., in the thickness direction of the card CA, may be smaller than a value obtained by subtracting the thickness T1 of the sheet SH from the thickness T2 of the card CA. The length T101 may be a distance between a right end portion 31BB in a lower end edge 31BA of a front surface 31B and a lower end edge 101C of the lid 101 in the vertical direction. Since the lower end edge 101C is disposed on the upper side of the lower area 22A, the lid 101 may be separated, in the vertical direction, from the sheet SH which is to be ejected from the first ejection port 12.

The position of the lid 101 may be changed from a position, as illustrated in FIG. 1, to a position, as illustrated in FIG. 3, by pivoting the lid 101 in the front direction about the pivot axis X101. In this manner, the position of the end portion 101A may be changed to substantially a front position of the lid support portion 150 of the side frame 33R.

The position of the lid 101, as illustrated in FIG. 3, may be referred to as the "open position." A position of the lid 101, as illustrated in a dash-dot-dot line in FIG. 5, may also be referred to as the "open position." In the open position, the lid 101 may exposed the upper area 22B of the second ejection port 22.

Referring to FIG. 8, a lower portion of the base portion 101B may include a cut away portion. A torsion coil spring 155 may be disposed between the base portion 101B and the lid support portion 150. One end of the torsion coil spring 155 may be attached to the lid support portion 150 and the other end of the torsion coil spring 155 may be attached to the base portion 101B. The torsion coil spring 155 may urge the lid 101 from the open position toward the closed position about the pivot axis X101. The torsion coil spring 155 may bias the lid 101 toward the closed position.

Referring to FIGS. 3 and 5, when the sheet SH is ejected from the first ejection port 12 to the outside of the housing 30, the lid 101 may not cover the lower area 22A of the second ejection port 22, e.g., a right end portion of the first ejection port 12, in the closed position thereof. Therefore, the lid 101 may not interfere with the sheet SH ejected from the first ejection port 12. When the card CA is ejected from the second ejection port 22 to the outside of the housing 30, a portion of the card CA, which passes through the upper area 22B, may contact the lid 101 and press the lid 101 in the front direction. The urging force of the torsion coil spring 155 may be set to permit the lid 101, which is pressed by the card CA, to change from the closed position to the open position. The opening and closing mechanism of the lid 101 may include the lid support portion 150 and the torsion coil spring 155.

Referring to FIGS. 3 and 6, the touch panel 70 may be attached to the side of the upper surface 31A inside the first housing 31. The touch panel 70 may be exposed to the outside through a rectangular opening 31H formed in the upper surface 31A. The touch panel 70 may include a liquid crystal panel, a light source and a touch sensitive film. The light source may be a fluorescent lamp and an LED and may emit light from a side of a back surface of the liquid crystal panel. The touch sensitive film may adhere to a surface of the liquid crystal panel.

The touch panel 70 may be controlled by the control substrate 54 to display an operation state of the image reading apparatus 1. The operation state may include a processing status and an error status of an image reading operation. The touch panel 70 may receive an operation instruction. In particular, the touch panel 70 may displays various buttons, such as a "START" button B1, as illustrated in FIG. 1. When the user touches the touch panel 70 to perform an execution instruction of a process corresponding to one of the buttons or performs setting input, the touch panel 70 may receive the operation and transmit the operation to the control substrate 54.

Referring to FIGS. 1 and 3, the open/close position sensor 60 may detect a position of the feed tray 36 with respect to the housing 30. In particular, the open/close position sensor 60 may be provided at a rear side upper end portion of the right side frame 33R and adjoin the right hinge portion 36R. The open/close position sensor 60 may include a microswitch and a rotary switch. The open/close position sensor 60 may selectively engage and disengage when the feed tray 36 pivot about the opening and closing axis X36. The open/close position sensor 60 may detect that the feed tray 36 is in the operating position and transmit a detection signal representing the detected result to the control substrate 54.

When the image on the sheet SH is to be read and the feed tray 36 is in the operating position, the operating position may be maintained. If the feed tray 36 is in the stored position, the feed tray 36 may be moved to the operating position by the user. Then, the user may place the sheet SH on the feed tray 36 which is in the operating position. If there is a reading instruction for the sheet SH via the touch panel 70, the control substrate 54 may start the image reading operation of the sheet SH. The sheet reading instruction via the touch panel 70 may be generated when a sheet reading "START" button displayed on the touch panel 70 is pressed. The sheet reading instruction may be transmitted to the control substrate 54. The sheet reading "START" button may be the same as the card reading "START" button B1, as illustrated in FIG. 1.

After checking that the open/close position sensor 60 has detected that the feed tray 36 is in the operating position and the sheet sensor has detected that the sheet SH is in the feed tray 36, the control substrate 54 may drive the driving motor 40M of the conveyance unit 40. The separation roller 48 may rotate while nipping the sheet SH in cooperation with the separating pad 49. The separation roller 48 may introduce the sheet SH on the feed tray 36 from the first inlet port 11 and feed the sheet SH to the conveyance path 10. If a plurality of sheets SH are to be conveyed in an overlapped manner, the sheet SH may be separated one by one by the frictional force between the separating pad 49 and the sheet SH.

The conveyance rollers 42A, 42B, and 42C and the driven rollers 43A, 43B, and 43C, and the ejection rollers 44A, 44B, and 44C and the driven rollers 45A, 45B, and 45C of the conveyance unit 40 may convey, in the conveyance path 10, the sheet SH which is to be introduced through the first inlet port 11. Images on both sides of the sheet SH, which is conveyed in the conveyance path 10, may be read by the image reading sensors 55A and 55B.

Referring to FIG. 3, after the images are read, the sheet SH may be ejected from the first ejection port 12 to the exterior of the housing 30 by the ejection rollers 44A, 44B, and 44C and the driven rollers 45A, 45B, and 45C. Since the lid 101 in the closed position does not cover the lower area 22A of the second ejection port 22, e.g., the right end portion of the first ejection port 12, the lid 101 may not interfere with the sheet SH ejected from the first ejection port 12.

When the image on the card CA is to be read and the feed tray 36 is in the stored position, the stored position may be maintained and, if the feed tray 36 is in the operating position, the feed tray 36 may be moved to the stored position. Referring to FIG. 2, the card CA may be inserted in the second inlet port 22 by the user from the rear side of the housing 30. The card CA may pass through the card path 29 and a leading end of the card CA may reach the card conveying area 20. The control substrate 54 may start the image reading operation of the card CA when a reading instruction of the card CA is issued via the touch panel 70. The card reading instruction via the touch panel 70 may be generated when a card reading "START" button B1 displayed on the touch panel 70 is pressed. The card reading instruction may be transmitted to the control substrate 54.

After checking that a card sensor has detected that the card CA is in the second inlet port 22, the control substrate 54 may drive the driving motor 40M of the conveyance unit 40. The conveyance roller 42C and the driven roller 43C and the ejection roller 44C and the driven roller 45C may convey, in the card conveying area 20, the card CA which has been introduced from the second inlet port 21 and passed through the card path 29. Images on both sides of the card CA, which is conveyed in the conveyance path 20, may be read by the image reading sensors 55A and 55B.

Referring to FIG. 3, after the images are read, the card CA may be ejected from the second ejection port 22 to the exterior of the housing 30 by the ejection roller 44C and the driven roller 45C. The lid 101 which covers, in the closed position thereof, the upper area 22B of the second ejection port 22 may be pressed by the card CA to pivot from the closed position to the open position against the urging force of the torsion coil spring 155. Thus, the ejection of the card CA from the second ejection port 22 may not be hindered by the lid 101.

The sheet SH and the card CA, which are different in width, may be conveyed in the conveyance path 10. Since the conveyance path 10 may be used as both the conveyance path of the sheet SH and the conveyance path of the card CA, the size of the device may be reduced.

The position of the lid 101 may be changed with respect to the housing 30 between the open position and the closed position. In particular, the lid 101 may be a single member, which is pivotably supported by the housing 30 about the pivot axis X101 that extends in the vertical direction on the right end side of the first ejection port 12 and on the right end side of the second ejection port 22. The lid 101 may extend toward the left side from the pivot axis X101. In the closed position, the lid 101 may cover the upper area 22B of the second ejection port 22 which is shared by the right end portion of the first ejection port 12, and may control reverse insertion of the card CA in the second ejection port 22. When the card CA is to be ejected from the second ejection port 22, the torsion coil spring 155, which constitutes the opening and closing mechanism of the lid 101, may change the position of the lid 101 from the closed position to the open position and cause the lid 101 to expose the second ejection port 22. Therefore, the ejection of the card CA from the second ejection port 22 may not be hindered by the lid 101. Accordingly, the sheet SH and the card CA, which are different in width, may be conveyed and the reverse insertion of the card CA in the second ejection port 22 may be prevented.

In this image reading apparatus 1, the lid 101 may be pivotably supported by the housing 30 about the pivot axis X101. The vertical direction, in which the pivot axis X101 extends, may be the thickness direction of the card CA, which is ejected from the second ejection port 22. If the lid 101 is pivotably supported by the housing 30 about a shaft extending in the width direction of the card CA, e.g., in the left-right direction, the end edge of the lid 101 may be caught in embossing formed on the surface of the card CA. In this regard, the end edge of the lid 101 pivoting about the pivot axis X101 may not interfere with the right surface of the card CA or contact with the surface of the card CA. Therefore, the end edge of the lid 101 may not be caught in the embossing on the card CA.

Since the image reading apparatus 1 includes a torsion coil spring 155, which is simple and compact, the manufacturing cost and size may be reduced, as compared with when a solenoid opening and closing mechanism is used.

Figure 9:
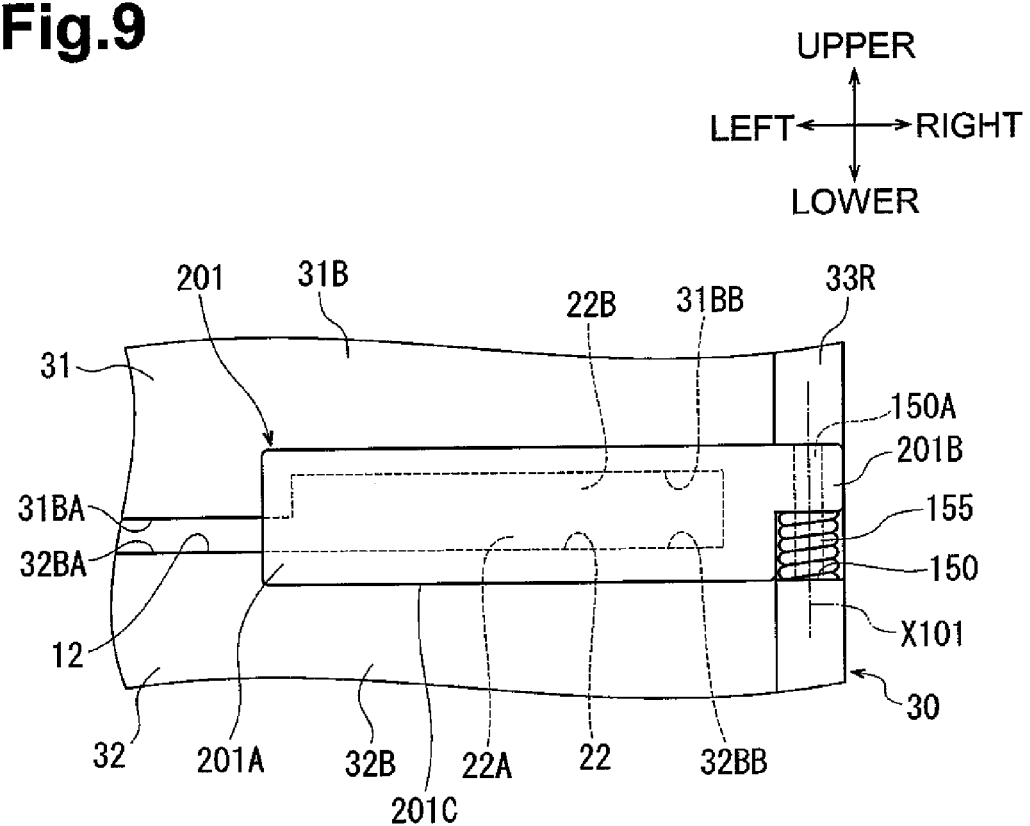
FIG. 9 is an enlarged front view illustrating a second ejection port of an image reading apparatus according to another embodiment of the invention.

Referring to FIG. 9, in another embodiment, a lid 201 may be used. When the lid 201 is in a closed position, an end portion 201A of the lid 201 on the left end thereof may be disposed on the left side of a second ejection port 22. The base portion 201B may be connected to a support shaft 150A included in a lid support portion 150. The lid 201 may be pivotably supported by a housing 30 about a pivot axis X101. A torsion coil spring 155 may be disposed between the base portion 201B and the lid support portion 150.

A lower end edge 201C of the lid 201 may continue from a lower end of the end portion 201A and extend horizontally to the right direction beyond the second ejection port 22. The lower end edge 201C may be disposed on a lower side of a lower area 22A of the second ejection port 22. In the closed position, the lid 201 may cover the entire second ejection port 22.

When the sheet SH is ejected from the first ejection port 12 to the exterior of the housing 30, the sheet SH may contact the lid 201 and press the lid 201 in the front direction. When the card CA is ejected from the second ejection port 22 to the outside of the housing 30, the lid 201 may contact the lid 201 and press the lid 201 in the front direction. The urging force of the torsion coil spring 155 may be set so as to permit the position of the lid 101, which is pressed by the sheet SH or the card CA, to change from the closed position to the open position.

The opening and closing mechanism of the lid 201 may include the lid support portion 150 and the torsion coil spring 155. The lid 201 may cover the entire second ejection port 22 in the closed position and control reverse insertion of the card CA to the second ejection port 22.

When the sheet SH is ejected from the first ejection port 12, the torsion coil spring 155 may change the position of the lid 201 from the closed position to the open position to cause the lid 201 to expose the right end portion of the first ejection port 12. When the card CA is ejected from the second ejection port 22, the torsion coil spring 155 may change the position of the lid 201 from the closed position to the open position to cause the lid 201 to expose the second ejection port 22. Therefore, ejection of the sheet SH from the first ejection port 12 and ejection of the card CA from the second ejection port 22 may not be hindered by the lid 201.

Figure 10:
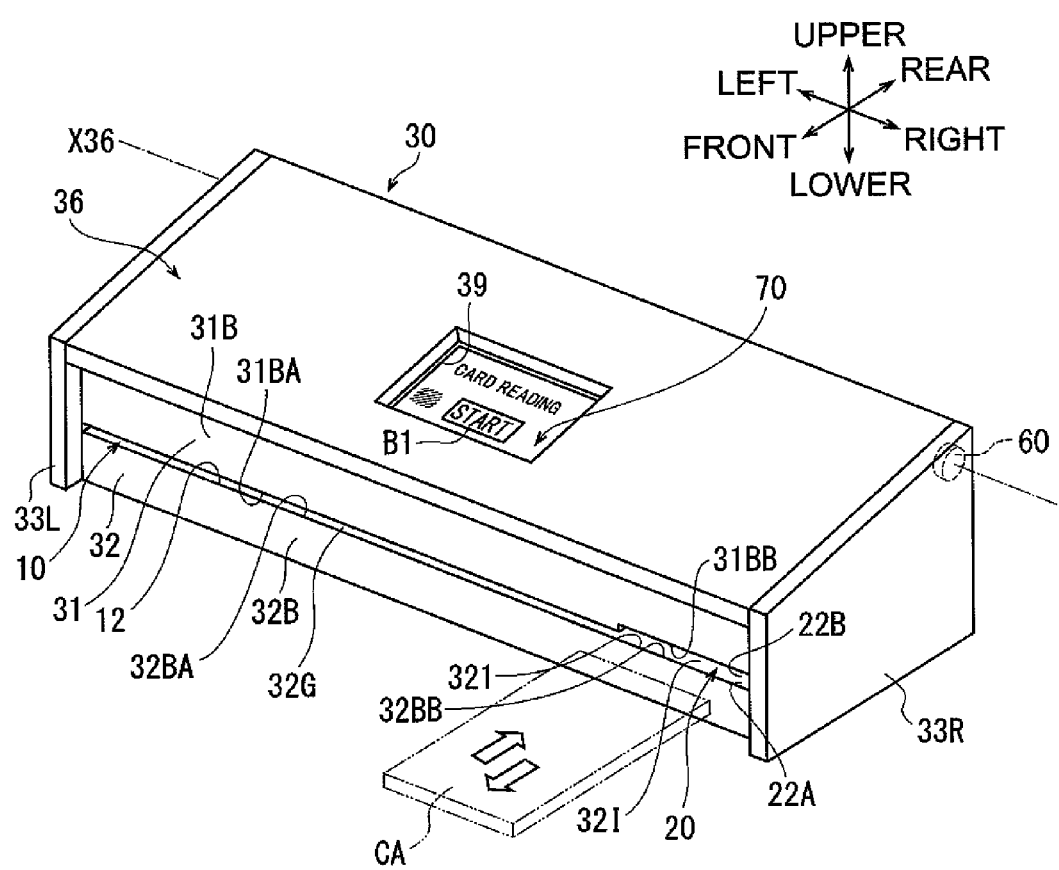
FIG. 10 is a perspective view illustrating a front side of an image reading apparatus according to another embodiment of the invention.
Figure 11:
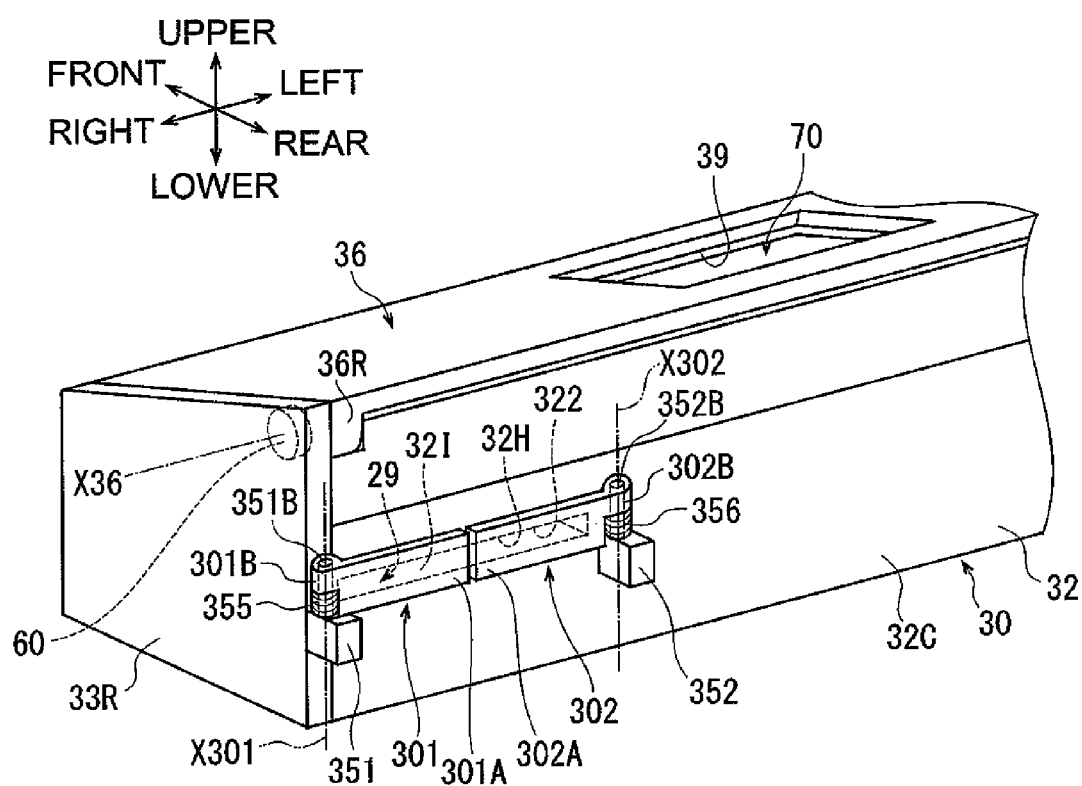
FIG. 11 is a perspective view illustrating a rear side of an image reading apparatus according to another embodiment of the invention.
Figure 12:
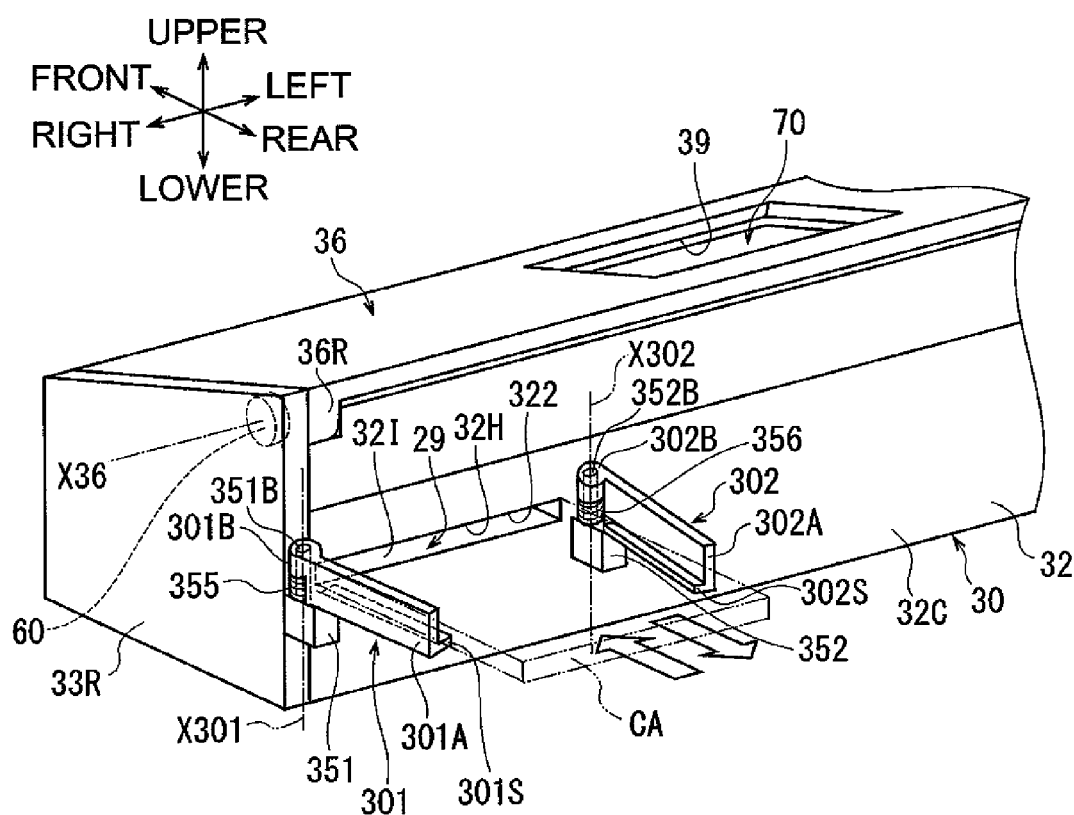
FIG. 12 is a perspective view illustrating a rear side of an image reading apparatus according to another embodiment of the invention.

Referring to FIGS. 10-12, in yet another embodiment, a second inlet and ejection port 321 and an intermediate ejection port 322 may be provided. A first lid 301, a second lid 302, lid support portions 351 and 352 and torsion coil springs 355 and 356 may be used. Referring to FIG. 10, the second inlet and ejection port 321 may be shared by a part of the first ejection port 12 on the side of the right end thereof. The second inlet and ejection port 321 may be used both as an inlet port into which the card CA is introduced and an ejection port from which the entire card CA is ejected. Referring to FIGS. 11 and 12, a part of the card CA may be exposed temporarily from the intermediate ejection port 322. The intermediate ejection port 322 may be an example of the "second ejection port."

Referring to FIG. 11, the first lid 301 may be a plate-shaped member extending in the left-right direction. A first end portion 301A on the left side of the first lid 301 may be disposed at the intermediate portion in the left-right direction of the intermediate ejection port 322. A base portion 301B on the right side of the first lid 301 may be disposed on a rear end edge of the right side frame 33R.

A block-shaped lid support portion 351 may be formed to protrude in the rear direction at the rear end edge of the right side frame 33R. The lid support portion 351 may be disposed on the right side of the intermediate ejection port 322. The base portion 301B of the first lid 301 may be connected to a support shaft 351B included in the lid support portion 351. Thereby, the first lid 301 may be pivotably supported by the housing 30 about a first pivot axis X301 which may extend in the vertical direction.

The second lid 302 may be a plate-shaped member which is symmetrically identical to the first lid 301. A second end portion 302A on the right side off the second lid 302 may be disposed at the intermediate portion in the left-right direction of the intermediate ejection port 322 and may face the first end portion 301A of the first lid 301. The base portion 302B of the second lid 302 on the left side may be disposed further to the left than the intermediate ejection port 322.

A block-shaped lid support portion 352 may be formed to protrude in the rear direction at a position further to the left than the intermediate ejection port 322 on the rear surface 32C of the second housing 32. The base portion 302B of the second lid 302 may be connected to a support shaft 352B included in the lid support portion 352. The second lid 302 may be pivotably supported by the housing 30 about a second pivot axis X302 which extends in the vertical direction.

Positions of the first lid 301 and the second lid 302, as illustrated in FIG. 11, may be referred to as "closed positions"

thereof. In the closed positions thereof, the first lid 301 and the second lid 302 may cover the intermediate ejection port 322 from the rear direction.

The first lid 301 may pivot about the first pivot axis X301 in the rear direction from a state illustrated in FIG. 11 to a state in which the first end portion 301A is disposed on the rear side of the lid support portion 351, as illustrated in FIG. 12. The second lid 302 may pivot about the second pivot axis X302 in the rear direction from a state illustrated in FIG. 11 to a state in which the second end portion 302A is disposed on substantially the rear side of the lid support portion 352, as illustrated in FIG. 12. Positions of the first lid 301 and the second lid 302, as illustrated in FIG. 12, may be referred to as "open positions." In the open positions, the first lid 301 and the second lid 302 may expose the intermediate ejection port 322 from the rear direction.

Referring to FIG. 11, lower portions of the base portions 301B and 302B may include cut away portions. A torsion coil spring 355 may be disposed between the base portion 301B and the lid support portion 351. A torsion coil spring 356 may be disposed between the base portion 302B and the lid support portion 352. The torsion coil spring 355 may urge the first lid 301 toward the closed position from the open position about the first pivot axis X301. The torsion coil spring 356 may urge the second lid 302 toward the closed position from the open position about the second pivot axis X302. The torsion coil springs 355 and 356 may support the first lid 301 and the second lid 302 when the first lid 301 and the second lid 302 are not pressed.

Referring to FIG. 12, when a part of the card CA is exposed temporarily to the exterior of the housing 30 from the intermediate ejection port 322, the card CA may contact the first lid 301 and the second lid 302 and press the first lid 301 and the second lid 302 in the rear direction. The urging force of the torsion coil springs 355 and 356 may be set so as to permit the positions of the first lid 301 and the second lid 302, which are pressed by the card CA, to change from the closed positions to the open positions.

The opening and closing mechanisms of the first lid 301 and the second lid 302 may include the lid support portions 351 and 352 and the torsion coil springs 355 and 356. The card CA may be introduced into the second inlet and ejection port 321. The conveyance unit 40 may convey the card CA in the rear direction in the card conveying area 20 and in the card path 29. This conveyance of the card CA in the rear direction may be performed when a CPU of a control substrate 54 causes the conveyance unit 40 to be driven. A part of the card CA may be ejected temporarily from the intermediate ejection port 322 to the exterior of the housing 30. Then, the first lid 301 and the second lid 302, which cover the intermediate ejection port 322, may be pressed by the card CA and pivot from the closed positions to the open positions thereof against the urging force of the torsion coil springs 355 and 356. Therefore, the ejection of a part of the card CA from the intermediate ejection port 322 may not be hindered by the first lid 301 and the second lid 302. The card CA may then be conveyed in the rear direction by the conveyance unit 40 until the card CA reaches an alignment position.

Next, the conveyance unit 40 may convey the card CA in the front direction in the card conveying area 20 and in the card path 29. After an image is read by image reading sensors 55A and 55B, the card CA may be ejected from the second inlet and ejection port 321 to the exterior of the housing 30.

The first lid 301 and the second lid 302, which cover the intermediate ejection port 322 in the closed positions thereof, may control reverse insertion of the card CA in the intermediate ejection port 322. Since the first lid 301 and the second lid 302 extend in the rear direction of the image reading apparatus 1 in the open position thereof, the first lid 301 and the second lid 302 may function as spacers which may keep a distance between the image reading apparatus 1 and an object disposed on the rear side of the image reading apparatus 1. Therefore, a jam of the card CA may be prevented.

Since the intermediate ejection port 322 is situated on the opposite side of the first ejection port 12 in the conveying direction of the sheet SH, even if the first lid 301 and the second lid 302 have the configurations described above, the ejection of the sheet SH from the first ejection port 12 may not be hindered.

Referring to FIG. 12, the first lid 301 may include a support member 301S and the second lid 302 may include a support member 302S. When the first lid 301 is in the open position, the support member 301S may protrude to the left from a lower end edge of the first lid 301. When the second lid 302 is in the open position, the support member 302S may protrude to the right from a lower end edge of the second lid 302.

When a part of card CA is exposed temporarily to the exterior of the housing 30 from the intermediate ejection port 322 and the positions of the first lid 301 and the second lid 302 are changed to the open positions thereof, the support member 301S and the support member 302S may support, from below, right and left edges of the exposed part of the card CA. With this configuration, tilting down of the exposed part of the card CA may be prevented. Since the card CA may be guided by the support member 301S, the support member 302S and other components, skewing of the card CA or other problems may be prevented.

Figure 13:
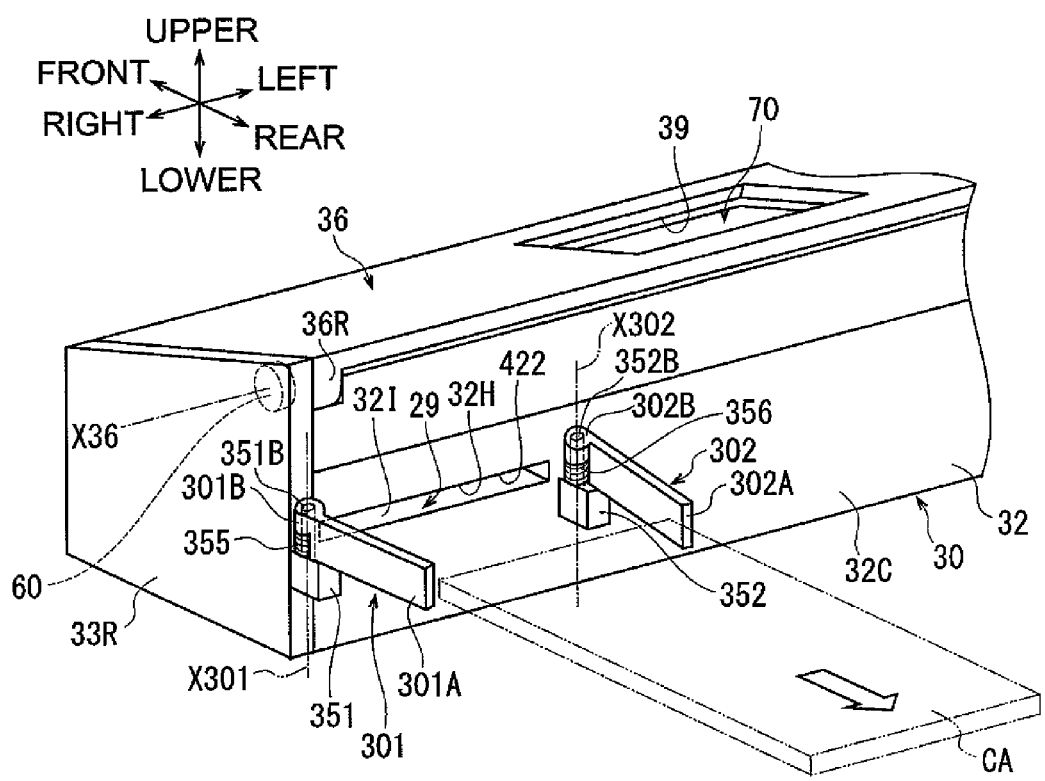
FIG. 13 is a perspective view illustrating a rear side of an image reading apparatus according to still another embodiment of the invention.

Referring to FIG. 13, in still another embodiment, a second inlet port, into which a card CA may be introduced, and a second ejection port 422, from which the card CA may be ejected, may be provided. A first lid 301 and a second lid 302 may cover a second ejection port 422 in closed positions thereof.

The card CA may be introduced into the second inlet port. A conveyance unit 40 may convey the card CA in the rear direction in a card conveying area 20. After an image is read by image reading sensors 55A and 55B, the card CA may pass through a card path 29 and may be ejected from the second ejection port 422 to the extrior of the housing 30. Then, the first lid 301 and the second lid 302, which cover the second ejection port 422, may be pressed by the card CA and, as illustrated in FIG. 13, may pivot from the closed positions to the open positions thereof against the urging force of the torsion coil springs 355 and 356. Therefore, the first lid 301 and the second lid 302 may not interfere with the card CA ejected from the second ejection port 422.

The first lid 301 and the second lid 302, which cover the second ejection port 422 in the closed positions thereof, may control reverse insertion of the card CA in the second ejection port 422. Since the first lid 301 and the second lid 302 extend in the rear direction of the image reading apparatus 1 in the open position thereof, the first lid 301 and the second lid 302 may function as spacers which keep a distance between the image reading apparatus 1 and an object disposed on the rear side of the image reading apparatus 1. Therefore, a jam of the card CA may be prevented.

Figure 14:
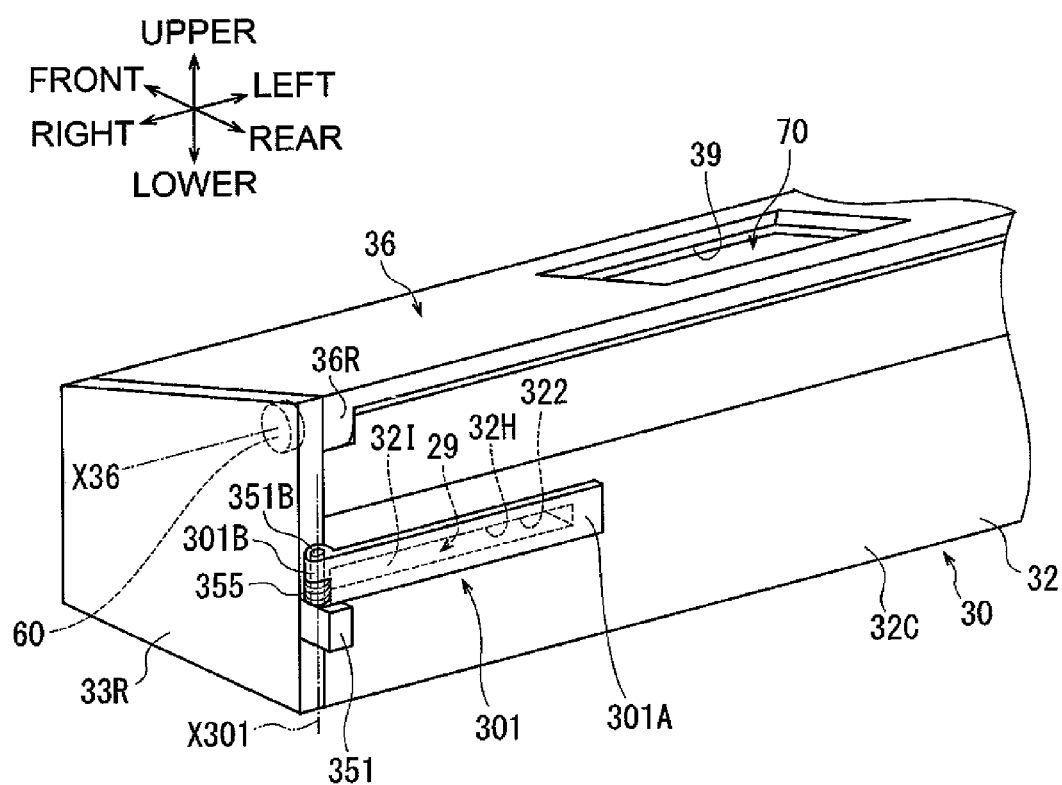
FIG. 14 is a perspective view illustrating a rear side of an image reading apparatus according to yet another embodiment of the invention.

Referring to FIG. 14, in another embodiment, a first lid 301 may be extended to the left so that an end portion 301A of a first lid 301 may be disposed further to the left than an intermediate ejection port 322. The first lid 301 may cover the entire intermediate ejection port 322 in a closed position thereof and expose the entire intermediate ejection port 322 in an open position thereof. The first lid 301, which covers the intermediate ejection port 322 in the closed position thereof may control reverse insertion of a card CA in the intermediate ejection port 322. Since the first lid 301 and the second lid 302 extend in the rear direction of the image reading apparatus 1 in the open position thereof, the first lid 301 and the second lid 302 may function as spacers which keep a distance between the image reading apparatus 1 and an object disposed on the rear side of the image reading apparatus 1. Therefore, a jam of the card CA may be prevented.

The card CA may be ejected from the second ejection port 22 to the exterior of housing 30. In another embodiment, after the card CA is exposed temporarily from the second ejection port 22, the card CA may be conveyed in a reverse direction toward the second inlet port 21 and may be ejected from the second inlet port 21 to the outside of the housing 30.

The image reading sensors 55A and 55B may include the CIS. In another embodiment, a charge coupled device (CCD) may be employed.

The present disclosure may be applied to image reading apparatus, image forming apparatus or a multi-functional peripheral.

While the disclosure has been described in detail with reference to the specific embodiment thereof, this is merely an example, and various changes, arrangements and modifications may be applied therein without departing from the spirit and scope of the disclosure. Other embodiments will be apparent to those skilled in the art from a consideration of the specification or practice of the invention disclosed herein. It is intended that the specification and the described examples are considered merely as exemplary of the invention, with the true scope of the invention being defined by the following claims.

What is claimed is:

1. An image reading apparatus, comprising:
   a roller configured to rotate about a rotating axis and configured to convey a particular medium in a conveying direction;
   a reader configured to read the particular medium; and
   a body comprising:
      a first port formed in the body; and
      a lid pivotably attached to the body and configured to pivot about a pivoting axis, the pivoting axis being perpendicular to the conveying direction and the rotating axis,
   wherein the lid is configured to pivot between a first position, in which the lid covers at least a portion of the first port, and a second position, in which the lid is separated from the first port,
   wherein the pivoting axis of the lid is disposed at an end of the first port in a direction parallel to the rotating axis.

2. The image reading apparatus of claim 1, wherein the body further comprises:
   a second port formed in the body and configured to receive the particular medium selectively from an exterior and an interior of the body,
   wherein the roller is configured to convey the particular medium from the second port to the first port to expose a portion of the particular medium to an exterior of the body, and convey the particular medium from the first port to the second port to discharge particular medium to an exterior of the body through the second port.

3. The image reading apparatus of claim 1,
   wherein the first port is formed at a first side of the body;
   wherein the body further comprises:
      a second port formed at a second side of the body opposite from the first side of the body in the conveying direction;
      a third port formed at the second side of the body and configured to receive a second medium;
   wherein the roller is configured to convey the particular medium from the second port to the first port and discharge the particular medium through the second port.

4. The image reading apparatus of claim 1,
   wherein the first port is formed at a first side of the body;
   wherein the body further comprises:
      a second port formed at a second side of the body opposite from the first side of the body in the conveying direction;
      a third port formed at the first side of the body and configured to receive a second medium;
   wherein the roller is configured to convey the particular medium from the second port to the first port and discharge the particular medium through the second port.

5. The image reading apparatus according to claim 1,
   wherein the body further comprises a further lid pivotably attached to the body and configured to pivot about a further pivoting axis;
   wherein the further pivoting axis of the further lid is disposed at an opposite end of the first port in the direction parallel to the rotating axis, and
   wherein the lid extends from the pivoting axis toward a center portion of the first port in the direction parallel to the rotating axis and the further lid extends from the further pivoting axis toward the center portion of the first port in the direction parallel to the rotating axis.

6. The image reading apparatus according to claim 1,
   wherein the body further comprises a third port formed in the body and configured to discharge a further medium;
   wherein a portion of the third port overlaps with the first port and a width of the third port in a direction parallel to the rotating axis is greater than a width of the first port in the direction parallel to the rotating axis;
   wherein the pivoting axis of the lid is disposed between an upstream end portion of the body in the direction parallel to the rotating axis and an upstream end of the third port in the direction parallel to the rotating axis,
   wherein a residual portion of the third port remains uncovered by the lid when the lid is in the first position, and
   wherein the residual portion of the third port is separate from the first port.

7. The image reading apparatus according to claim 6,
   wherein the first port comprises a first opening area which overlaps with the portion of the third port and a second opening area adjacent to the first opening area in a direction parallel to the pivoting axis,
   wherein the first opening area is configured to allow a portion of the further medium to pass therethrough,
   wherein the first and second opening areas are configured to allow a portion of the particular medium to pass therethrough; and
   wherein the lid is configured to cover the second opening area when the lid is in the first position.

8. The image reading apparatus according to claim 7, wherein the lid is configured to cover the first and the second opening areas when the lid is in the first position.

9. The image reading apparatus according to claim 1, further comprising a torsion coil spring configured to bias the lid toward the first position.

10. The image reading apparatus according to claim 1, wherein the lid comprises a guide portion protruding from the lid toward the first port and extending in a direction parallel to the rotating axis when the lid is in the first position.

11. An image reading apparatus comprising:
means for receiving a particular medium into a body of the image reading apparatus;
means for reading the particular medium;
means for discharging the particular medium from the body of the image reading apparatus through a first port formed in the body;
means for conveying the particular medium in the body of the image reading apparatus; and
means for covering the first port.

12. An image reading apparatus, comprising:
a roller configured to rotate about a rotating axis and configured to convey a particular medium in a first direction, the rotating axis extending in a second direction perpendicular to the first direction;
a reader configured to read the particular medium;
a body configured to provide:
  a first path between a first port and a second port, the first port formed at a first side of the body, the second port formed at a second side of the body opposite from the first side of the body in the first direction; and
  a second path between a third port and a fourth port, the third port being offset from the first port in a third direction perpendicular to the first and second directions, the third port being formed in a position located at one side of the first port in the second direction, a portion of the first port overlapping with the fourth port and a width of the first port in the second direction being greater than a width of the fourth port in the second direction; and
a lid pivotably attached to the body and configured to pivot about a pivoting axis parallel to the third direction, the lid being configured to pivot between a first position and a second position, the lid covering one of the third port and the fourth port in the first position, the lid being separated from the one of the third port and the fourth port in the second position, and the pivoting axis of the lid being disposed at an end of the one of the third port and the fourth port in the second direction.

13. The image reading apparatus according to claim 12, further comprising:
a further lid pivotably attached to the body and configured to pivot about a further pivoting axis disposed at an opposite end of the one of the third port and the fourth port in the second direction,
wherein the lid extends from the pivoting axis toward a center portion of the one of the third port and the fourth port in the second direction and the further lid extends from the further pivoting axis toward the center portion of the one of the third port and the fourth port in the second direction.

14. The image reading apparatus according to claim 12, further comprising a torsion coil spring configured to bias the lid toward the first position.

15. The mage reading apparatus according to claim 12, wherein the lid comprises a guide portion protruding from the lid toward the one of the third port and the fourth port and extending in the second direction when the lid is in the first position.

* * * * *